United States Patent
Kimura et al.

(10) Patent No.: US 9,126,347 B2
(45) Date of Patent: Sep. 8, 2015

(54) MICROSCOPIC GEOMETRY CUTTING DEVICE AND MICROSCOPIC GEOMETRY CUTTING METHOD

(71) Applicant: Toshiba Kikai Kabushiki Kaisha, Chiyoda-ku, Tokyo (JP)

(72) Inventors: Seiji Kimura, Numazu (JP); Sumihisa Kondo, Numazu (JP)

(73) Assignee: TOSHIBA KIKAI KABUSHIKI KAISHA, Chiyoda-ku, Tokyo (JP)

( * ) Notice: Subject to any disclaimer, the term of this patent is extended or adjusted under 35 U.S.C. 154(b) by 0 days.

(21) Appl. No.: 14/047,922

(22) Filed: Oct. 7, 2013

(65) Prior Publication Data

US 2014/0033890 A1 Feb. 6, 2014

Related U.S. Application Data

(62) Division of application No. 12/175,948, filed on Jul. 18, 2008, now Pat. No. 8,579,563.

(30) Foreign Application Priority Data

Jul. 19, 2007 (JP) ................. 2007-188024
May 23, 2008 (JP) ................. 2008-135404

(51) Int. Cl.
  *B23D 3/00* (2006.01)
  *B26D 3/08* (2006.01)
  (Continued)

(52) U.S. Cl.
  CPC .............. *B26D 3/085* (2013.01); *B23B 29/125* (2013.01); *G05B 19/4163* (2013.01);
  (Continued)

(58) Field of Classification Search
  CPC ............. G05B 19/4163; G05B 19/416; G05B 19/4166; G05B 13/0255; G05B 2219/41344;
  G05B 19/23; G05B 19/231; G05B 19/27; G05B 19/29; G05B 19/291; B26D 3/085; B23B 29/125; B23B 2265/16; Y10T 409/50082; Y10T 409/506232; Y10T 409/504428; Y10T 409/500164
  USPC ................... 409/326, 289, 315; 700/159, 173
  See application file for complete search history.

(56) References Cited

U.S. PATENT DOCUMENTS 6,585,461 B1 7/2003 Saito
6,662,073 B1 12/2003 Fujishima
(Continued)

FOREIGN PATENT DOCUMENTS

JP 10-333752 12/1998
JP 11-020045 1/1999
(Continued)

OTHER PUBLICATIONS

English language of translation of JP-2006-123085.
(Continued)

*Primary Examiner* — Jason L Vaughan
(74) *Attorney, Agent, or Firm* — DLA Piper LLP (US)

(57) ABSTRACT

A microscopic geometry cutting device includes: a controller that outputs a timer count start command in starting a driving program which controls a drive of an X-axis or a Y-axis moving mechanism; an arrival time calculator that calculates an arrival time from when the timer count start command is output till when the cutter arrives at a machining start position in accordance with relative moving speed information of the moving mechanisms and machining start position information of a workpiece W; an elapsed time determiner that determines whether an elapsed time from when the timer count start command is output is coincident with the arrival time and outputs a trigger signal when the elapsed time is coincident with the arrival time; and a reciprocating stage driver that drives the reciprocating stage in a manner that the cutter advances and retracts in a predetermined cutting depth in response to the trigger signal.

1 Claim, 9 Drawing Sheets

(51) Int. Cl.
*B23B 29/12* (2006.01)
*G05B 19/416* (2006.01)

(52) U.S. Cl.
CPC ...... *B23B 2260/108* (2013.01); *B23B 2265/16* (2013.01); *G05B 2219/41344* (2013.01); *Y10T 409/50082* (2015.01); *Y10T 409/500164* (2015.01); *Y10T 409/504428* (2015.01); *Y10T 409/506232* (2015.01)

(56) References Cited

U.S. PATENT DOCUMENTS

| | | | |
|---|---|---|---|
| 6,776,563 | B2 | 8/2004 | Shamoto |
| 6,830,415 | B2 | 12/2004 | Shiba |
| 6,993,410 | B2 | 1/2006 | Esterling |
| 7,136,718 | B2 | 11/2006 | Kozai |
| 7,344,342 | B2 | 3/2008 | Kawai |
| 7,500,812 | B2 | 3/2009 | Onozuka |
| 8,256,590 | B2 * | 9/2012 | Suzuki et al. ............. 188/379 |
| 2007/0248430 | A1 | 10/2007 | Kawai |

FOREIGN PATENT DOCUMENTS

| | | |
|---|---|---|
| JP | 11-305819 | 11/1999 |
| JP | 2000-158235 | 6/2000 |
| JP | 2003-311589 | 11/2003 |
| JP | A 15-311527 | 11/2003 |
| JP | 2005-007487 | 1/2005 |
| JP | 2006-123085 | 5/2006 |
| JP | 2007-58278 | 3/2007 |
| KR | 2005-40261 | 5/2005 |
| KR | 0497660 | 7/2005 |
| KR | 100995941 | 1/2010 |
| TW | I244971 | 12/2005 |
| WO | WO 02/03155 | 1/2002 |

OTHER PUBLICATIONS

Office Action issued in Korean Appl 10-2008-69899 on Apr. 1, 2010.
English Language Translation of Office Action issued in Korean Appl 10-2008-69899 on Apr. 1, 2010.
English Language Abstract of JP 2003-311527 published May 11, 2003.
Machine Translation of JP 2003-311527 published May 11, 2003.
English Language Abstract of KR 10-2005-0040261 published May 3, 2005.
Office Action issued in KR Appl 10-2010-58316 on Oct. 6, 2010.
English Translation of Office Action issued in KR Appl 10-2010-58316 on Oct. 6, 2010.
English Abstract of KR Patent 0497660 published Jul. 1, 2005.
Search Report issued in TW 97127342 on Oct. 15, 2011 with partial English Translation.
English Language Abstract of JP 2007-58278 published Mar. 8, 2007.
English Language translation of JP 2007-58278 published Mar. 8, 2007.
English Language Abstract of JP 2000-158235 published Jun. 13, 2000.
English Language Translation of JP 2000-158235 published Jun. 13, 2000.
English Language Abstract of JP 2006-123085 published May 18, 2006.
English Language Abstract of TW I244971 published Dec. 11, 2005.
Japanese Office Action issued in JP 2007-188024 on Feb. 21, 2012.
English Language Translation of Japanese Office Action issued in JP 2007-188024 on Feb. 21, 2012.
English Language Abstract of JP 2005-007487 published on Jan. 13, 2005.
English Language Translation of JP 2005-007487 published on Jan. 13, 2005.
English Language Abstract of JP 11-305819 published Nov. 5, 1999.
English Language Translation of JP 11-305819 published Nov. 5, 1999.
English Language Abstract of JP 11-020045 published Jan. 26, 1999.
English Language Translation of JP 11-020045 published Jan. 26, 1999.
Translation of Foreign Patent Document: Chong Du Cho et al. KR 100497660, Apparatus for Sensing Chatter Vibration Generated for NC Lathe and Method Thereof, Jul. 1, 2005.
Translation of Foreign Patent Document: Gazuo Watanabe, et al. KR 100995941, Processing Method and Processing Device, Nov. 22, 2010.
English Language Abstract of JP 2003-311589 published on Nov. 5, 2003.
English Language Translation of JP 2003-311589 published on Nov. 5, 2003.
Japanese Office Action issued in JP 2008-135404 on Jan. 8, 2013.
English Language Translation of Japanese Office Action issued in JP 2008-135404 on Jan. 8, 2013.
Image File Wrapper of Related U.S. Appl. No. 12/175,948.

* cited by examiner

MICROSCOPIC GEOMETRY CUTTING DEVICE AND MICROSCOPIC GEOMETRY CUTTING METHOD

CROSS REFERENCE TO RELATED APPLICATIONS

This application is a Divisional of application Ser. No. 12/175,948 filed Jul. 18, 2008. Application Ser. No. 12/175,948 is based on and claims priority of Japanese Patent Application Nos. 2007-188024, filed on Jul. 19, 2007 and 2008135404, filed on May 23, 2008.

BACKGROUND OF THE INVENTION

1. Field of the Invention

The present invention relates to a microscopic geometry cutting device and microscopic geometry cutting method for providing a microscopic asperity on a surface of a workpiece.

2. Description of Related Art

Conventionally, a microscopic surface cutting device and microscopic cutting method disclosed in document (JP-A-2006-123085) have been known as a device and method for providing a microscopic asperity on a surface of a workpiece. The microscopic surface cutting device includes: a first reciprocating slide mechanism; a second slide mechanism that moves for intermittent positioning in a direction orthogonal to a moving direction of the first slide mechanism; a tool moving mechanism that quickly and finely controls cutting depth of a cutter in a direction orthogonal to moving directions of the first and second slide mechanisms; and a position detector that generates a pulse signal in accordance with a movement of the first slide mechanism. For providing a microscopic surface geometry on the surface of the workpiece, the cutting depth of the cutter is quickly changed by the tool moving mechanism in synchronism with the pulse signal generated from the position detector during a movement of the first slide mechanism in a positive direction, and the cutter is moved away from the workpiece during a movement of the first slide mechanism in a reverse direction. Further, the second slide mechanism is feed in increments with each reciprocation of the first slide mechanism. In this manner, the microscopic surface geometry is provided on the surface of the workpiece. In the device and method as disclosed in the above-described document, during the movement of the first slide mechanism in the positive direction, position information of the first slide mechanism is detected by the position detector and the pulse signal from the position detector is counted. Subsequently, whether or not a counted value is coincident with a predetermined value is determined, a trigger signal is output when the count value is coincident with the predetermined value, and then the cutting depth of the cutter is quickly changed by the tool moving mechanism by the trigger signal. In such arrangement, it is necessary to count the pulse signal generated from the position detector and determine whether the counted value is coincident with the predetermined value. Accordingly, a timing for advancement and retraction of the cutter is likely to be delayed and a highly accurate microscopic surface geometry may not he provided on the surface of the workpiece. Especially, when machining a roller for microlens transcription molding or a transcription molding die used for transcription molding of a plurality of microlenses on a sheet, a microlens molding section to be machined molds a circular minute unit lens (e.g. concave or convex lens) of which outer diameter is about 10-300 μm and depth is 0.6-50 μm. Accordingly, the highly accurate microscopic surface geometry cannot be provided on the surface of the workpiece when the timing for the advancement and retraction of the cutter fluctuates. Additionally, in the device and method as disclosed in the above-described document, a machining condition is determined generally by selecting a feed speed through a trial-and-error process while considering a necessary time or the like for machining a target geometry. However, the above-described method requires considerable time to determine the machining condition. Further, due to a dynamic characteristics to quickly change the cutting depth of the cutter by the tool moving mechanism, amplitude of an actual movement track of the cutter is reduced or phase-delay is generated relative to a target track of the cutter as shown in FIG. 11. Furthermore, resonance is occasionally generated due to an intrinsic frequency of a device having a slide mechanism. Thus, the movement track and target track of the cutter are not coincident, whereby a cutting error is increased.

SUMMARY OF THE INVENTION

An object of the present invention is to provide a microscopic geometry cutting device and microscopic geometry cutting method for accurately and efficiently providing a microscopic geometry on a surface of a workpiece. A microscopic geometry cutting device according to an aspect of the present invention includes: a table on which a workpiece is mounted; a cutter; an X-axis moving mechanism and a Y-axis moving mechanism that relatively move the table and the cutter in X-axis direction and Y-axis direction which are orthogonal to each other; a Z-axis moving mechanism having a cutting shaft that advances and retracts the cutter in Z-axis direction which is orthogonal to the X-axis direction and the Y-axis direction; a reciprocating stage that is provided on the cutting shaft and quickly changes a cutting depth of the cutter in the Z-axis direction; a controller that stores a driving program for controlling a drive of the respective moving mechanisms, controls the drive of the respective moving mechanisms in accordance with the driving program, and outputs a timer count start command in starting the driving program; an arrival time calculator that calculates from when the timer count start command is output till when the cutter arrives at a machining start position of the workpiece in accordance with a relative movement speed information of at least one of the X-axis moving mechanism and Y-axis moving mechanism and machining start position information of the workpiece; an elapsed time determiner that measures an elapsed time from when the controller outputs the timer count start command, determines whether the elapsed time is coincident with the arrival time calculated by the arrival time calculator, and outputs a trigger signal when the elapsed time is coincident with the arrival time; and a reciprocating stage driver that drives the reciprocating stage in a manner that the cutter advances and retracts in a predetermined cutting depth in response to the trigger signal from the elapsed time determiner.

In this arrangement, after the driving program is started by the controller, the drive of the X-axis moving mechanism, Y-axis moving mechanism and Z-axis moving mechanism is controlled in accordance with the driving program while the timer count start command is output.

Subsequently, the elapsed time determiner measures the elapsed time from when the controller outputs the timer count start command and determines whether or not the elapsed time is coincident with the arrival time calculated by the arrival time calculator. When the elapsed time measured by the elapsed time determiner is coincident with the arrival time calculated by the arrival time calculator, the trigger signal is output.

The reciprocating stage driver drives the reciprocating stage in such a manner that the cutter advances and retracts in the predetermined cutting depth in response to the trigger signal from the elapsed time determiner. Accordingly, the cutter advances and retracts in the predetermined cutting depth. Thus, the microscopic geometry can be provided on the surface of the workpiece.

According to the aspect of the present invention, the elapsed time is measured from when the timer count start command is output in starting the driving program, and the reciprocating stage is driven in response to the trigger signal output when the elapsed time is coincident with the arrival time preliminarily calculated by the arrival time calculator. Thus, the highly accurate microscopic surface geometry can he provided on the surface of the workpiece.

In other words, since a related art is not utilized, in which position information is detected by a position detector, a pulse signal from the position detector is counted, whether or not a counted value is coincident with a preset value is determined, and a cutting depth of a cutter is quickly changed by a tool moving mechanism by a trigger signal when the counted value and the preset value are coincident, the highly accurate microscopic geometry can be provided on the surface of the workpiece.

It is preferably that the controller executes a feed operation for relatively moving the table and the cutter from a first position to a second position in the X-axis direction by controlling the drive of the X-axis moving mechanism; an escape operation for moving the cutter from the second position to a third position in the Z-axis direction to move away from the table by controlling, the Z-axis moving mechanism; a return operation for relatively moving the table and the cutter from the third position to a fourth position in the X-axis direction opposite to the direction in the feed operation; and an approach operation for moving the cutter from the fourth position to the first position by controlling the Z-axis moving mechanism; and the reciprocating stage is driven during the feed operation.

In such arrangement, the table and the cutter are moved depicting a rectangular locus, in which the table and the cutter are feed from the first position to the second position, and then moved away from the second position to the third position. Subsequently, the cutter is returned from the third position to the fourth position and finally approached from the fourth position to the first position. During the feed operation from the first position to the second position in these relative movement operations, the drive of the reciprocating stage is controlled in such a manner that the cutter advances and retracts relative to the surface of the workpiece in the predetermined cutting depth. Consequently, a highly accurate microscopic geometry can be provided on the surface of the workpiece so that the moving mechanisms are relatively easily controlled. The reciprocating stage preferably includes a piezoelectric element laminate in which a plurality of piezoelectric elements are laminated. In this arrangement, the piezoelectric element laminate in which a plurality of piezoelectric elements are laminated is used as the reciprocating stage. Accordingly, the cutting depth of the cutter can be quickly controlled. Thus, a microscopic geometry can he high-accurately provided on the surface of the workpiece.

A microscopic geometry cutting method according to another aspect of the present invention for providing a microscopic geometry on a surface of a workpiece using a microscopic geometry cutting device including a table on which a workpiece is mounted a cutter; an X-axis moving mechanism and a Y-axis moving mechanism that relatively move the table and the cutter in X-axis direction and Y-axis direction which are orthogonal to each other; a Z-axis moving mechanism having a cutting shaft that advances and retracts the cutter in Z-axis direction which is orthogonal to the X-axis direction and the Y-axis direction; and a reciprocating stage that is provided on the cutting shaft and quickly changes a cutting depth of the cutter in the Z-axis direction, the microscopic geometry cutting method includes: a step for controlling a drive of the respective moving mechanisms in accordance with a driving program and outputting a timer count start command in starting the driving program; an arrival time calculating step for calculating an arrival time from when the timer count start command is output till when the cutter arrives at a machining start position of the workpiece in accordance with relative movement speed information of at least one of the X-axis moving mechanism and Y-axis moving mechanism and machining start position information of the workpiece; an elapsed time determining step for measuring an elapsed time from when the controller outputs the timer count start command, determining whether the elapsed time is coincident with the arrival time calculated in the arrival time calculating step, and outputting a trigger signal when the elapsed time is coincident with the arrival time; and a reciprocating stage driving step for driving the reciprocating stage in a manner that the cutter advances and retracts in a predetermined cutting depth when the trigger signal is output.

The above arrangement may offer the advantage similar to that of the above-described microscopic geometry cutting device. A microscopic geometry cutting method according to still another aspect of the present invention for providing a microscopic geometry on a surface of a workpiece, includes: providing a reciprocating stage that quickly changes a cutting depth of a cutter and a relative moving mechanism that relatively moves the cutter and the workpiece in a direction substantially orthogonal to a cutting direction of the cutter; an input step for inputting a target geometry and feed speed for machining the surface of the workpiece; a frequency analyzing step for analyzing a frequency of a target track of the cutter decided according to the target geometry and feed speed input in the input step; a machining condition deciding step for deciding a machining condition from a result obtained in the frequency analyzing step; a program generating step for generating a machining program in accordance with the machining condition decided in the machining condition deciding step; and a machining step for executing a machining in accordance with the machining program generated in the program generating step. In this arrangement, after the target geometry and feed speed for machining the surface of the workpiece are input, the frequency of the target track of the cutter decided according to the input target geometry and feed speed is analyzed. Accordingly, a frequency component of the target track of the cutter is obtained so that the most appropriate machining condition is decided from the frequency component. Consequently, the machining program is generated in accordance with the machining condition decided in this manner so that the machining is executed in accordance with the machining program.

According to the above aspect of the present invention, the frequency or the target track of the cutter decided according to the target geometry and the feed speed is analyzed and the machining condition such as the most appropriate feed speed is decided according to the frequency analyzing result so that the microscopic geometry can be efficiently and accurately provided on the surface of the workpiece. In other words, since it is not necessary to decide the machining condition through a trial-and-error process, the machining condition can be efficiently decided and an amplitude reduction of the actual movement track of the cutter, the phase-delay and the like are decreased. Thus, the highly accurate microscopic geometry can be provided on the surface of the workpiece.

It is preferable that the feed speed is selected and decided in the machining condition deciding step so that an intrinsic frequency of a device including the reciprocating stage and the relative moving mechanism is not coincident with a frequency component of the target track obtained in the frequency analyzing step.

In this arrangement, the feed speed is selected in such manner that the intrinsic frequency of the device including the reciprocating stage and the relative moving mechanism is not coincident with the frequency component of the target track obtained in the frequency analysis step. Thus, a machining can he executed under a condition that the resonance is not caused.

The microscopic geometry cutting method preferably includes: a transfer function measuring step for measuring transfer functions of the reciprocating stage and the respective moving mechanisms; and a simulating step for simulating a movement track of the cutter relative to the target track using the transfer functions measured in the transfer function measuring step, in which in the machining condition deciding step, the machining condition is decided based on a simulation result obtained in the simulating step.

In this arrangement, the transfer functions of the reciprocating stage and the relative moving mechanism are measured and the movement track of the cutter relative to the target track input in the input step is simulated using the transfer functions. Thus, the machining condition with small errors can be decided based on the simulation result.

In the microscopic geometry cutting method, a Fourier transform or wavelet transform is preferably used for analyzing the frequency in the frequency analyzing step.

A microscopic geometry cutting device according to further aspect of the present invention for providing a microscopic geometry on a surface of a workpiece, includes: a cutter of which cutting depth is quickly changed, the cutter and the workpiece being moved in a direction substantially orthogonal to a cutting direction of the cutter; a reciprocating stage that quickly changes the cutting depth of the cutter; a relative moving mechanism that relatively moves the cutter and the workpiece in the direction substantially orthogonal to the cutting direction of the cutter; an input device that inputs a target geometry and machining condition for machining on the surface of the workpiece, a controller that controls the reciprocating stage and the relative moving mechanism, the controller comprising: a frequency analyzer that analyzes a frequency of a target track of the cutter decided based on the target geometry and feed speed input by the input device; a machining condition decider that decides a machining condition in accordance with information input by the input device based on a result obtained by the frequency analyzer; a program generator that generates a machining program in accordance with the machining condition decided by the machining condition decider; and a machining controller that controls the reciprocating stage and the relative moving mechanism in accordance with the machining program generated in the program generating step.

In this arrangement, as well as the above-described microscopic geometry cutting method, the machining condition can be efficiently decided and the microscopic geometry can be highly accurately processed in a manner that the amplitude reduction, the phase-delay and the like are decreased.

The reciprocating stage preferably includes a piezoelectric element laminate in which a plurality of piezoelectric elements are laminated.

In such arrangement, the piezoelectric element laminate, in which a plurality of piezoelectric elements are laminated, is used as the reciprocating stage. Accordingly, the cutting depth of the cutter can be quickly controlled. Thus, a microscopic geometry can be highly accurately provided on the surface of the workpiece.

DETAILED DESCRIPTION OF PREFERRED EMBODIMENT(S)

1. First Exemplary Embodiment

A first exemplary embodiment of the present invention will be described below with reference to the attached drawings.

Figure 1:
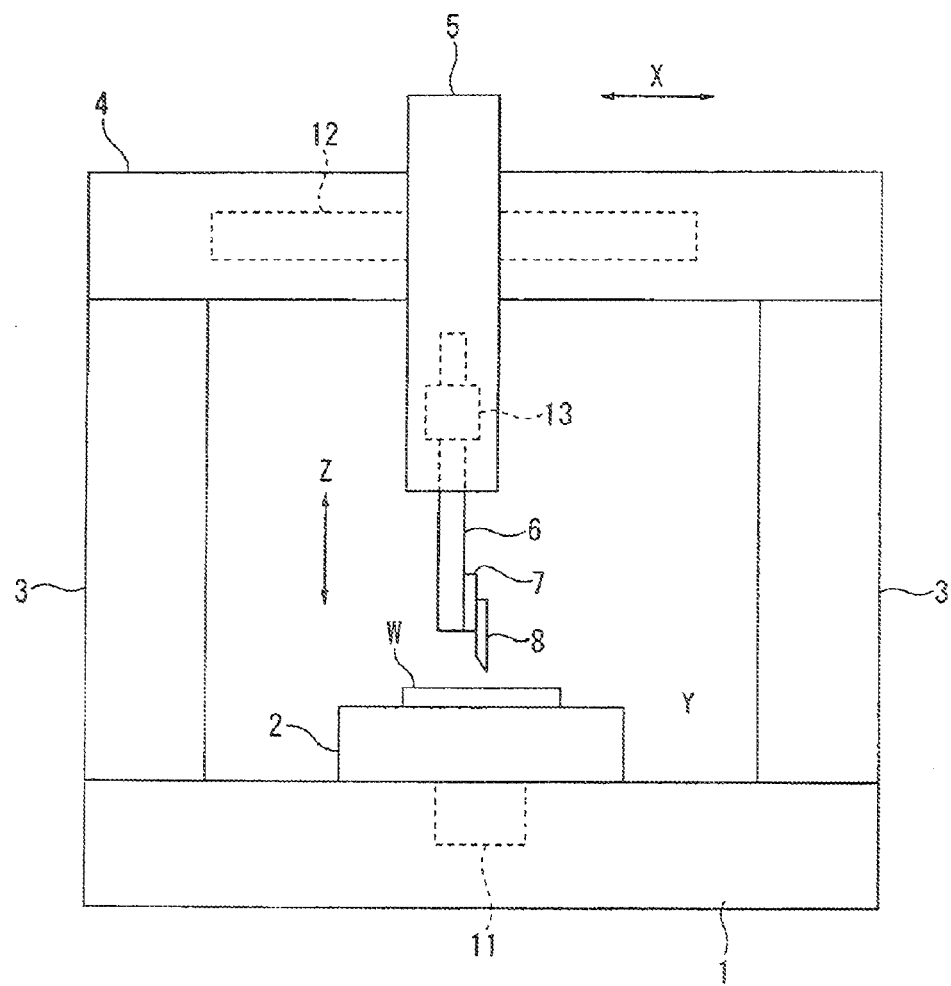
FIG. 1 is a front view illustrating an exemplary embodiment of a microscopic geometry cutting device according to the present invention.

Description of FIG. 1

FIG. 1 is a front view illustrating a microscopic geometry cutting device of the first exemplary embodiment according to the present invention. The microscopic geometry cutting device includes: a base 1; a table 2 provided on an upper surface of the base 1 to be movable in Y-axis direction (in a direction orthogonal to a plane of a paper of FIG. 1) and mount a workpiece W (an object to be machined) thereon; columns 3 provided on both sides of the base 1; a cross rail 4 that stretches between upper ends of the columns 3; a slider 5 that is movable in X-axis direction (in a horizontal direction in FIG. 1) along the cross rail 4; a cutting shaft 6 provided on the slider 5 to be movable in Z-axis direction (in a vertical direction in FIG. 1); and a cutter 8 attached to the cutting shaft 6 through a reciprocating stage 7. A Y-axis moving mechanism 11 is provided between the base 1 and the table 2 that moves the table 2 in the Y-axis direction. An X-axis moving mechanism 12 is provided between the cross rail 4 and the slider 5 that moves the slider 5 in the X-axis direction. A Z-axis moving mechanism 13 engaged with the cutting shaft 6 is provided between the slider 5 and the cutting shaft 6 that moves the cutting shaft 6 in the Z-axis direction. In other words, the microscopic geometry cutting device includes: the X-axis moving mechanism 12 and the Y-axis moving mechanism 11 that relatively move the table 2 on which the workpiece W is mounted and the cutter 8 in the X-axis direction and Y-axis direction which are orthogonal to each other; and the Z-axis moving mechanism 13 in such a manner that the cutter 8 advances or retracts in the Z-axis direction which is orthogonal to the X-axis direction and Y-axis direction. These moving mechanisms 11, 12 and 13 are provided by a ball screw feeding mechanism and the like, but the moving mechanisms are not restricted thereto. The reciprocating stage 7 is provided between the cutting shaft 6 and the cutter 8. Any stages that can quickly (at high speed) change the cutting depth, i.e. the advancement and retraction of the cutter 8, in the Z-axis direction may be used as the reciprocating stage 7. For example, the reciprocating stage 7 may be a piezoelectric element laminate in which a plurality of piezoelectric elements are laminated. A linear motor or voice coil may also be used.

Figure 2:
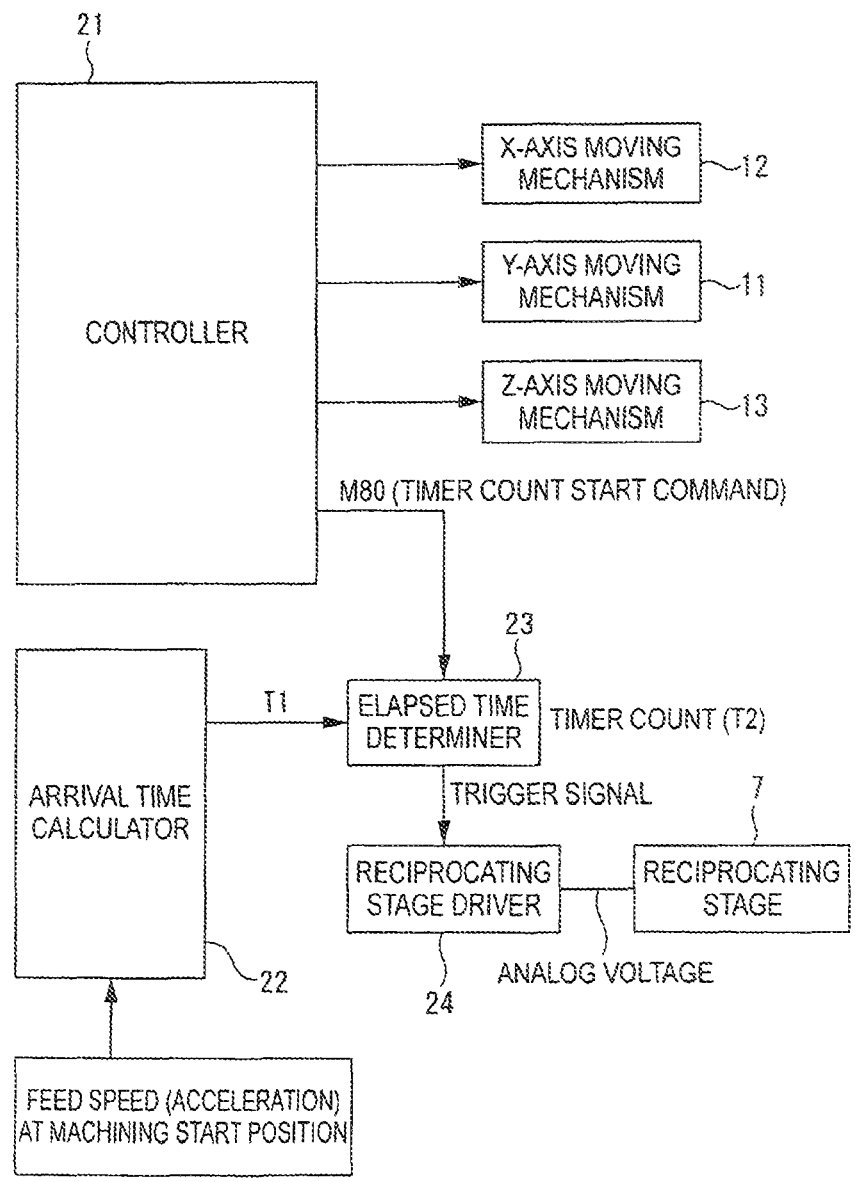
FIG. 2 is a block diagram illustrating a control system of a first exemplary embodiment according to the present invention.

Description of FIG. 2

FIG. 2 illustrates a control system of the microscopic geometry cutting device. The control system includes: a controller 21 that controls the X-axis moving mechanism 12, Y-axis moving mechanism 11 and Z-axis moving mechanism 13; an arrival time calculator 22; an elapsed time determiner 23; and a reciprocating stage driver 24.

The controller 21 stores a driving program for controlling a drive of the X-axis moving mechanism 12, Y-axis moving mechanism 11 and Z-axis moving mechanism 13, and controls the drive of the X-axis moving mechanism 12, Y-axis moving mechanism 11 and Z-axis moving mechanism 13 in accordance with the driving program while outputting a timer count start command (for example, an M80 code) based on the driving program in starting the driving program.

The arrival time calculator 22 calculates an arrival time T1 from when the timer count start command is output till when the cutter 8 arrives at a machining start position of the workpiece W based on a relative moving speed information (feed speed information and acceleration information) of at least one of the X-axis moving mechanism 12 and the Y-axis moving mechanism 11, and a machined geometry of the workpiece W, i.e. machining start position information. The elapsed time determiner 23 has a counter to measure an elapsed time T2 from when the controller 21 outputs the timer count start command. Subsequently, the elapsed time determiner 23 determines whether or not the elapsed time T2 is coincident with the arrival time T1 calculated by the arrival time calculator 22 and outputs a trigger signal when the elapsed time T2 is coincident with the arrival time T1. The reciprocating stage driver 24 drives the reciprocating stage 7 in such a manner that the cutter advances and retracts in the predetermined cutting depth, in response to the trigger signal from the elapsed time determiner 23. Specifically, the reciprocating stage driver 24 stores driving data of the reciprocating stage 7 for machining the surface geometry of the workpiece W and converts the stored driving data into an analog voltage to apply the analog voltage to the reciprocating stage 7 in response to the trigger signal from the elapsed time determiner 23.

Figure 3:
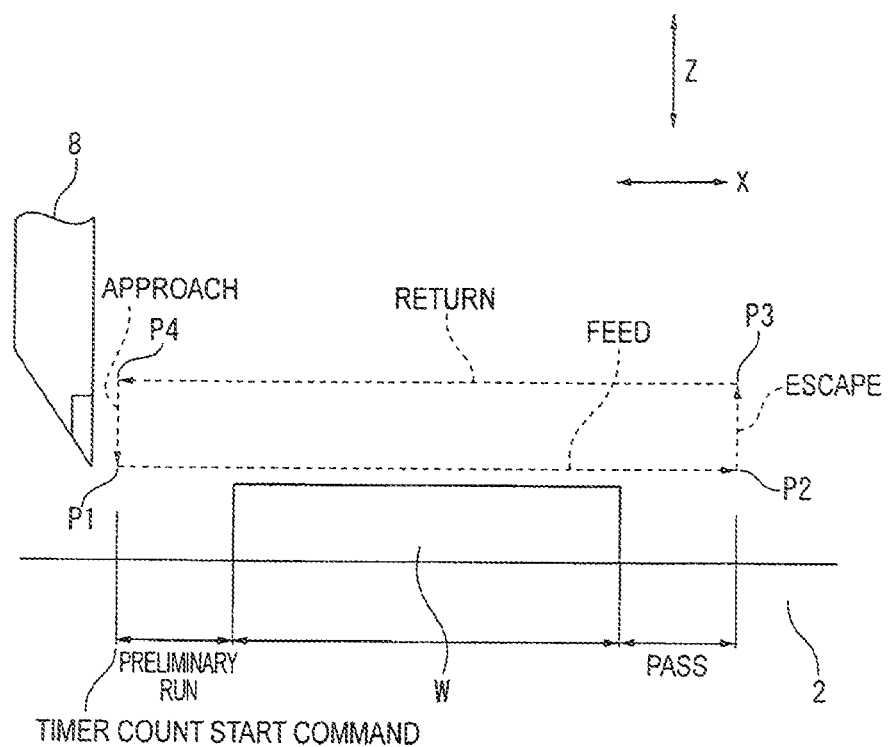
FIG. 3 illustrates a movement track of a cutter of exemplary embodiments according to the present invention.

Description of FIG. 3

FIG. 3 illustrates a relative movement track of the cutter 8 and the workpiece W controlled by the controller 21. When the driving program is started by the controller 21, the drive of the X-axis moving mechanism 12, Y-axis moving mechanism 11 and Z-axis moving mechanism 13 is controlled in accordance with the driving program while the timer count start command is output. Firstly, the cutter 8 is relatively moved from a first position P1 to a second position P2 in the X-axis direction by the driving control of the X-axis moving mechanism 12 (a feed operation). Secondly, the cutter 8 is moved from the second position P2 to a third position P3 in the Z-axis direction, i.e. a direction for the cutter 8 to move away from the table 2, by the driving control of the Z-axis moving mechanism 13 (an escape operation). Thirdly, the cutter 8 is moved from the third position P3 to a fourth position P4 in the X-axis direction, i.e. a reverse direction relative to the feed operation, by the driving control of the X-axis moving, mechanism 12 (a return operation). Finally, the cutter 8 is moved from the forth position P4 to the first position P1 by the driving control of the Z-axis moving mechanism 13 (an approach operation). Briefly, the cutter 8 moves in traverse along the workpiece W. When the driving program is started, i.e. when the feed operation is started, the controller outputs the timer count start command.

Figure 4:
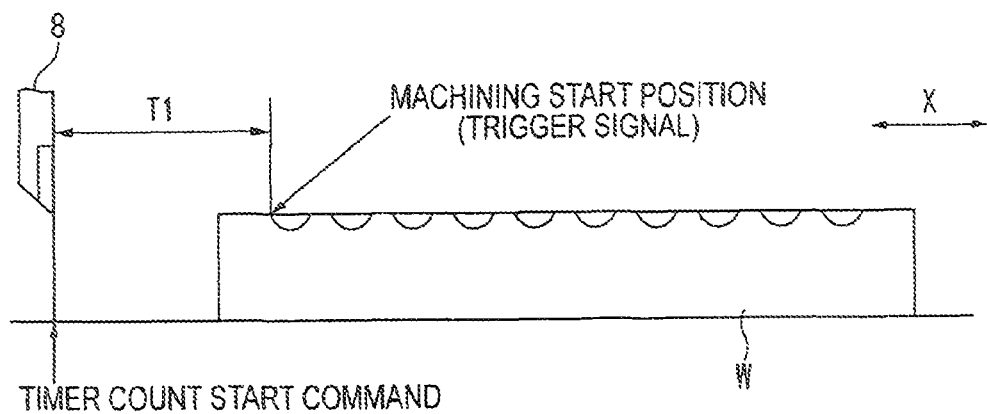
FIG. 4 illustrates a relationship between the cutter and a workpiece of the exemplary embodiments according to the present invention.
Figure 5:
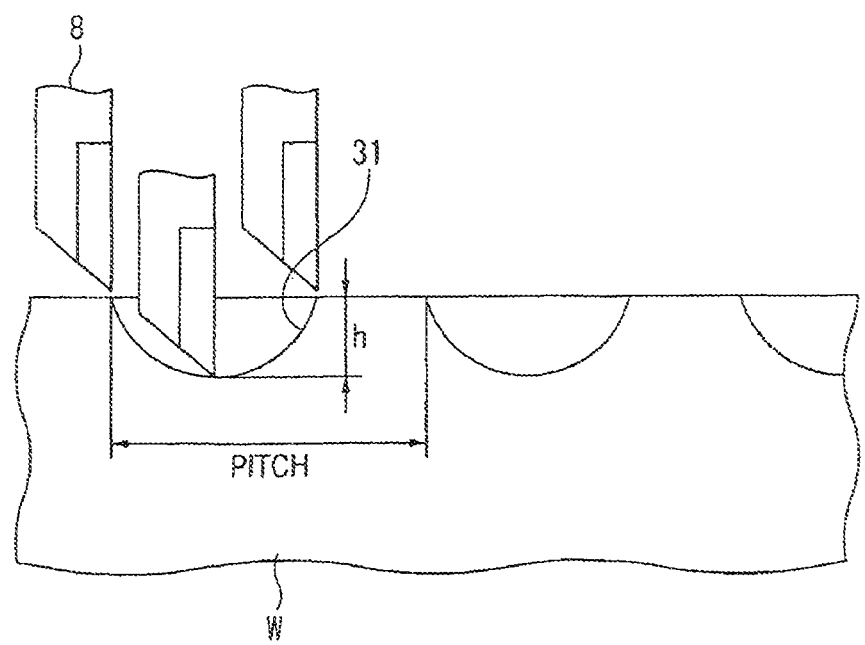
FIG. 5 illustrates how the cutter machines the workpiece of exemplary embodiments according to the present invention.

Description of FIGS. 4 and 5

FIGS. 4 and 5 illustrate a cutting process of the cutter 8 or the workpiece W after the driving program is started by the controller 21. Firstly, before the driving program is started by the controller 21, the arrival time calculator 22 calculates the arrival time T1 from when the controller 21 outputs the timer count start command till when the cutter 8 arrives at the machining start position of the workpiece W based on the relative moving speed information of the X-axis moving mechanism 12, the machining start position information of the workpiece W, and the like. In other words, based on a distance in X-axis direction from a position of the cutter 8 when the controller 21 outputs the timer count start command to the machining start position of the workpiece W, the feed speed and the acceleration information, the arrival time calculator 22 calculates the arrival time T1 from when the controller 21 outputs the timer count start command till when the cutter 8 arrives at the machining start position of the workpiece W as shown in FIG. 4. When the controller 21 starts the driving program, the elapse time determiner 23 measures the elapsed time T2 from when the controller 21 outputs the timer count start command till when the cutter 8 arrives at the machining start position of the workpiece W, and then determines whether or not the elapsed time T2 is coincident with the arrival time T1 calculated by the arrival time calculator 22. When the elapsed time T2 measured by the elapsed time determiner 23 is coincident with the arrival time T1 calculated by the arrival time calculator 22, the trigger signal is output.

The reciprocating stage driver 24 drives the reciprocating stage 7 in a manner that the cutter 8 advances and retracts in the predetermined cutting depth, in response to the trigger signal from the elapsed time determiner 23 and. For example, after the cutting depth is gradually increased and decreased every pitch, the cutting depth is controlled to be constant as shown in FIG. 5. In this manner, a cocave portion 31 with depth h is provided on the surface of the workpiece W every predetermined pitch. In other words, a microscopic asperity is provided on the surface of the workpiece W.

Thus, after the microscopic asperity is provided on the surface of the workpiece W in the X-axis direction, the Y-axis moving mechanism 11 is moved every predetermined pitch. By repeating the above-described movement every predetermined pitch, the microscopic asperity is provided on the whole surface of the workpiece W.

Advantages of First Exemplary Embodiment

According to the first exemplary embodiment, the following advantages can be obtained. (1) In the first exemplary embodiment, the elapsed time T2 is measured from when the timer count start command is output in starting the driving program, the reciprocating stage 7 is driven in response to the trigger signal output when the elapsed time T2 is coincident with the arrival time T1 preliminarily calculated by the arrival time calculator 22. Thus, the highly accurate microscopic surface geometry can be provided on the surface of the workpiece W. Specifically, since a related art is not utilized, in which position information is detected by a position detector; a pulse signal from the position detector is counted; whether or not a counted value is coincident with a preset value is determined; and a cutting depth of a cutter is quickly changed by a tool moving mechanism by a trigger signal when the counted value and the preset value are coincident, the highly accurate microscopic surface geometry can be provided. For example, a microlens molding die arranged with microscopic spherical concave portions every certain pitch may be machined. (2) In the first exemplary embodiment, the cutter 8 is feed from the first position P1 to the second position P2, and then moves away from the second position P2 to the third position P3. Subsequently, the cutter 8 returns from the third position P3 to the fourth position P4 and finally approaches from the fourth position P4 to the first position P1. During the feed operation from the first position P1 to the second position P2 in these rectangular relative movement operations, the drives of the reciprocating stage 7 is controlled in such a manner that the cutter 8 advances and retracts relative to the surface of the workpiece W in the predetermined cutting depth. Consequently, the highly accurate microscopic geometry can be provided on the surface of the workpiece W so that the moving mechanisms are relatively easily controlled. (3) In the first exemplary embodiment, the piezoelectric element laminate, in which the plurality of piezoelectric elements are laminated, is used as the reciprocating stage 7 so that the cutting depth of the cutter 8 can be quickly controlled. Thus, the microscopic geometry can be high-accurately provided on the surface of the workpiece W.

2. Second Exemplary Embodiment

Next, a second exemplary embodiment of the present invention will be described below with reference to the attached drawings. The second exemplary embodiment differs from the above-described first exemplary embodiment in that an input device 25 and a display 26 are provided for the control system of the microscopic geometry cutting device, and a controller 21 is provided to process data input by the input device 25. It should be noted that a detailed explanation for arrangements and components of the second exemplary embodiment which are identical with or correspond to those of the above-described first exemplary embodiment will be omitted or simplified.

Figure 6:
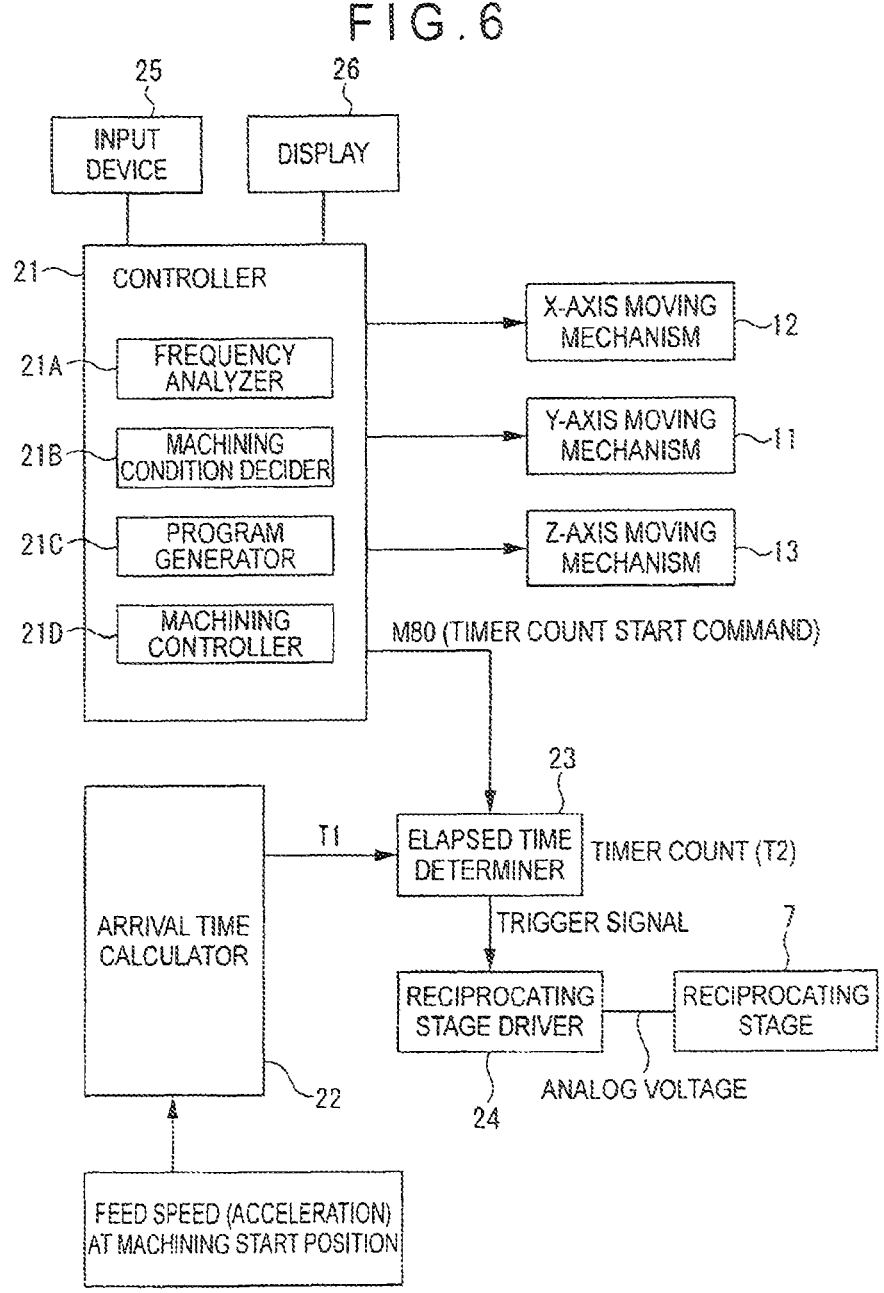
FIG. 6 is a block diagram illustrating a control system of a second exemplary embodiment according to the present invention.

Description of FIG. 6

FIG. 6 illustrates a control system of the microscopic geometry cutting device. The control system includes: the controller 21 that controls the X-axis moving mechanism 12, Y-axis moving mechanism 11 and Z-axis moving mechanism 13; the arrival time calculator 22; the elapsed time determiner 23; the reciprocating stage driver 24; the input device 25; and the display 26. The input device 25 inputs a target geometry, a machining condition and the like for machining the surface of the workpiece W. The display 26 displays various data, the condition and the like input by the input device 25 as well as a frequency analysis result, simulation result and the like. Specifically, the controller 21 includes: a frequency analyzer 21A that analyzes a frequency of a target track of the cutter 8 determined by the target geometry and feed speed (of the moving mechanism 11 or moving mechanism 12) input by the input device 25, a machining condition decider 21B that decides the machining condition in accordance with information input by the input device 25 based on a result obtained by the frequency analyzer 21A; a program generator 21C that generates a machining program based on the machining condition decided by the machining condition decider 21B; a machining controller 21D that controls the reciprocating stage 7 and respective moving mechanisms 11, 12 and 13 based on the machining program generated by the program generator 21C.

Description of FIGS. 7 to 10

Figure 7:
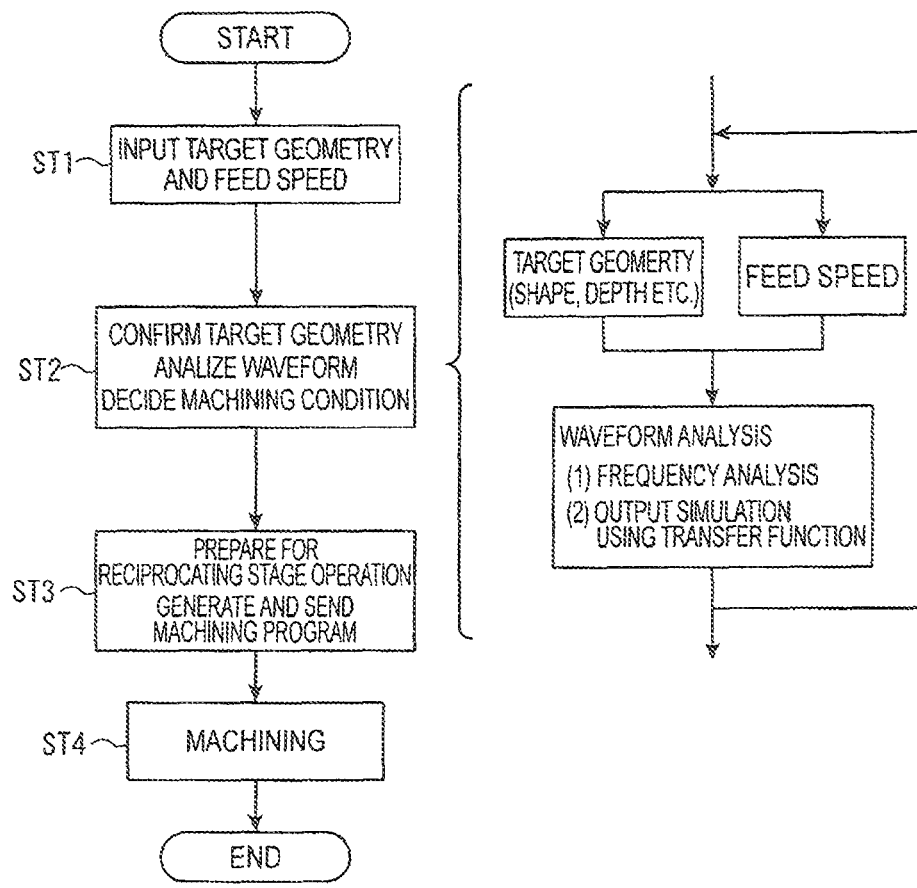
FIG. 7 is a flowchart for finely machining the workpiece of the second. exemplary embodiment according to the present invention.
Figure 8:
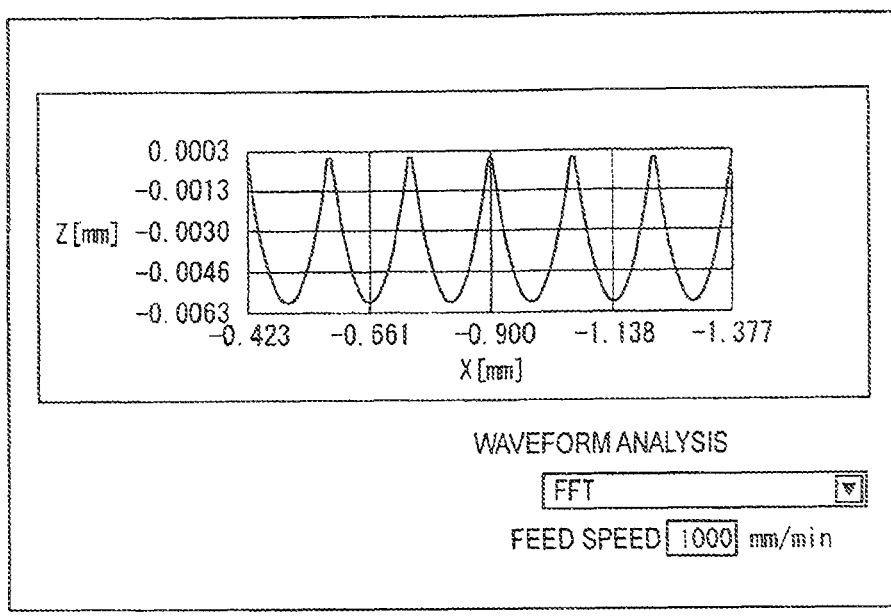
FIG. 8 illustrates an example of a screen during frequency analysis of the second exemplary embodiment according to the present invention.
Figure 9:
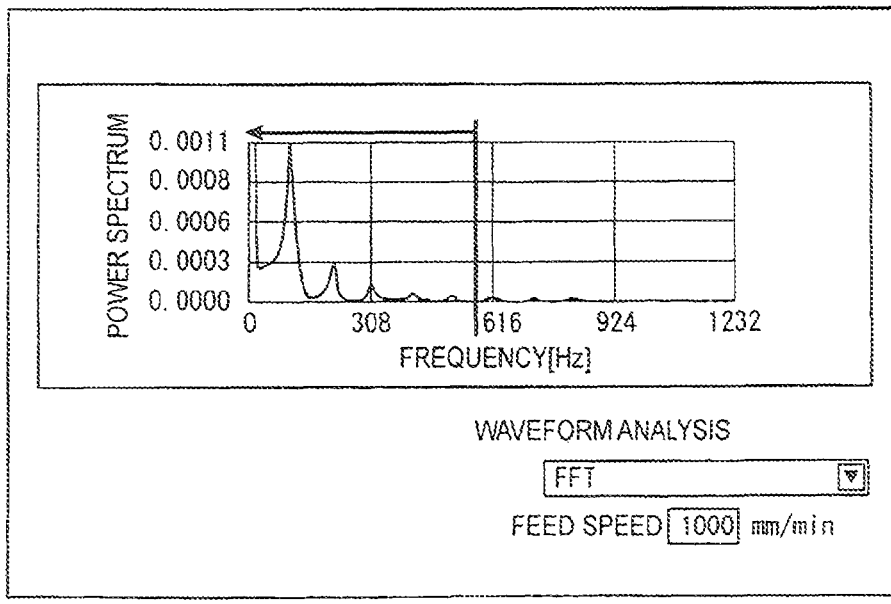
FIG. 9 illustrates an example of a screen that displays a frequency analysis result of the second exemplary embodiment according to the present invention.
Figure 10:
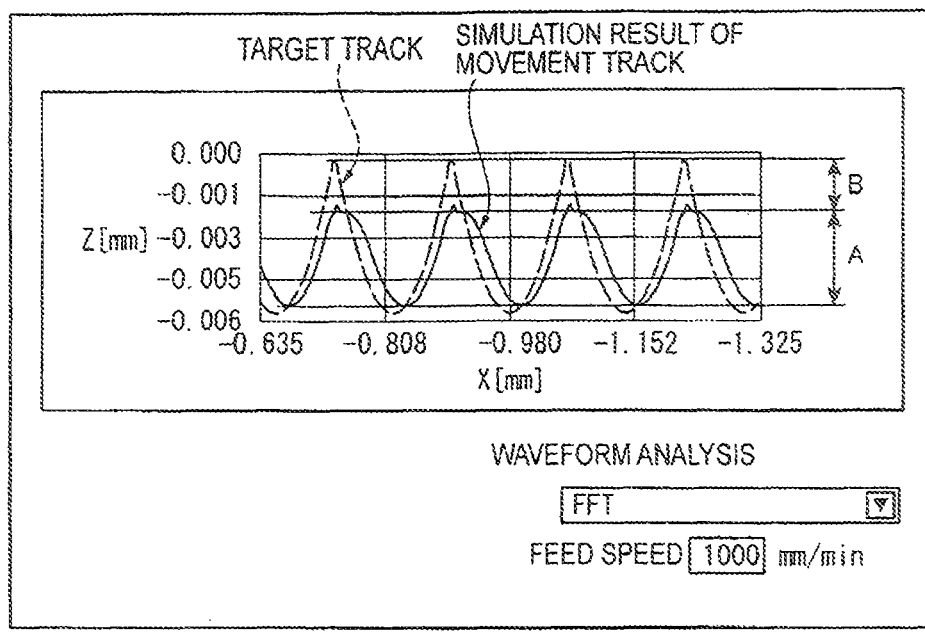
FIG. 10 illustrates a simulation result of a movement track of the second exemplary embodiment according to the present invention.
Figure 11:
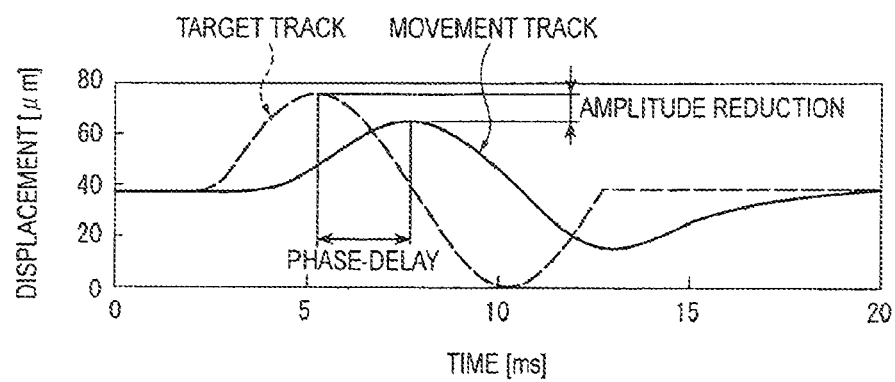
FIG. 11 illustrates a movement track relative to a target track of a cutter in a related art.

FIG. 7 is a flowchart for finely machining the workpiece W. Firstly, the target geometry and the feed speed for machining the surface of the workpiece W is input in ST1 (an input step). In ST2, after the input target geometry and the feed speed are confirmed, a waveform is analyzed and the machining condition is decided. Specifically, after the target geometry and the feed speed are confirmed, (1) the frequency of the target track of the cutter 8 determined by the target geometry and the feed speed is analyzed (a frequency analyzing step). Here, the frequency is analyzed using a Fourier transform or wavelet transform. For example, when a FFT (Fast Fourier transform) analysis is selected on a screen as shown in FIG. 8 (i.e. a screen of the display 26), the target track of the cutter 8 determined by the target geometry and the feed speed is analyzed using the FFT analysis and a frequency component of the target track of the cutter 8 is displayed on the screen as shown in FIG. 9. Accordingly, the machining condition is decided from an analysis result obtained from the frequency analysis (a machining condition deciding step). For example, a feed speed is selected and decided in such a manner that the frequency component of the target track obtained from the frequency analysis are not coincident with intrinsic frequencies of the reciprocating stage 7 and the moving mechanisms 11-13 so that resonance can be avoided. Next, (2) output simulation is performed by a transfer function. For example, the transfer functions of the reciprocating stage 7 and moving mechanisms 11-13 are measured (a transfer function measuring step), and then the movement track of the cutter 8 relative to the target track of the cutter 8 is simulated using the measured transfer functions (a simulating step) so that a machining with small errors can be realized. At this time, in the machining condition deciding step, the target geometry and machining condition (feed speed) are decided based on the simulation result obtained from the simulating step. For example, when high-frequency components of 2 μm or less depth are not coincident, a B portion may be set as an offset of the cutting shaft 6 to machine only an A portion as shown in FIG. 10. In ST3, operation of the reciprocating stage 7 is prepared while the machining program is generated (a program generating step) and sent in accordance with the machining condition decided in ST2. In ST4, the machining is executed in accordance with the generated machining program (a machining executing step).

Advantages of Second Exemplary Embodiment

According to the second exemplary embodiment, the following advantages can be obtained, in addition to the above-described advantages (1)-(3) of the first exemplary embodiment. (4) In the second exemplary embodiment, the frequency of the target track of the cutter 8 is preliminarily analyzed and the machining condition such as the most adequate feed speed is decided based on the frequency analysis result. Thus, the highly accurate microscopic geometry can be provided on the surface of the workpiece W. In other words, since an amplitude reduction of the actual movement track of the cutter 8 and phase-delay are decreased, the highly accurate microscopic geometry can be provided on the surface of the workpiece W. (5) In the machining condition deciding step according to the second exemplary embodiment, a feed speed is selected in such manner that the intrinsic frequency of a device including the reciprocating stage 7 and respective moving mechanism 11-13 is not coincident with the frequency component of the target track obtained from the frequency analysis step. Thus, the machining can be executed under a condition that the resonance is not caused. (6) In the second exemplary embodiment, the transfer functions of the reciprocating stage 7 and the like are measured (the transfer function measuring step) and subsequently the movement track of the cutter 8 relative to the target track of the cutter 8 decided by the target geometry and feed speed input by the input device 25 are simulated using the measured transfer functions (the simulation step). Thus, the machining can be executed with small errors. At this time, in the machining condition deciding step, the machining condition is decided based on the simulation result obtained from the simulating step.

Modification

It should be noted that the scope of the present invention is not restricted to the above-described embodiments, but includes modifications and improvements as long as an object of the present invention can be achieved. Although the table 2 is movable in the Yi-axis direction and the cutter 8 is movable in the X-axis direction in the above exemplary embodiments, each of the table 2 and the cutter 8 may be movable in a reverse direction. Specifically, the table 2 may be movable in the X-axis direction and the cutter 8 may be movable in the Y-axis direction. Alternatively, one of the table 2 and the cutter 8 may he movable in both of the X-axis direction and the Y-axis direction. Although the X-axis moving mechanism 12 moves the cutter 8 in the X-axis direction while the cutting depth of the cutter 8 is controlled by driving the reciprocating stage 7 in the above exemplary embodiments, the Y-axis moving mechanism 11 may move the cutter 8 in the Y-axis direction while the cutting depth of the cutter 8 may be controlled by driving the reciprocating stage 7. Alternatively, the X-axis moving mechanism 12 and Y-axis moving mechanism Ii may move the cutter 8 in the X-axis direction and Y-axis direction while the cutting depth of the cutter 8 may be controlled by the reciprocating stage 7. Although the machining method for providing the concave portion 31 every predetermined pitch on the surface of the workpiece W has been explained in the exemplary embodiments, the machining method is not restricted thereto. For example, the machining method may be used to randomly provide a concave portion or gap on the surface of the workpiece W.

What is claimed is:

1. A microscopic geometry cutting method for providing a microscopic geometry on a surface of a workpiece using a microscopic geometry cutting device including: a table on which a workpiece is mounted; a cutter; an X-axis moving mechanism and a Y-axis moving mechanism that relatively move the table and the cutter in X-axis direction and Y-axis direction which are orthogonal to each other; a Z-axis moving mechanism having a cutting shaft that advances and retracts the cutter in Z-axis direction which is orthogonal to the X-axis direction and the Y-axis direction; and a reciprocating stage that is provided on the cutting shaft and changes a cutting depth of the cutter at high speed in the Z-axis direction, the microscopic geometry cutting method comprising:

a step for controlling a drive of the respective moving mechanisms in accordance with a driving program and outputting a timer count start command in starting the driving program;

an arrival time calculating step for calculating an arrival time from when the timer count start command is output till when the cutter arrives at a machining start position of the workpiece in accordance with relative movement speed information of at least one of the X-axis moving mechanism and Y-axis moving mechanism and machining start position information of the workpiece;

an elapsed time determining step for measuring an elapsed time from when the controller outputs the timer count start command, determining whether the elapsed time is coincident with the arrival time calculated in the arrival time calculating step, and outputting a trigger signal when the elapsed time is coincident with the arrival time; and a reciprocating stage driving step for driving the reciprocating stage in a manner that the cutter advances and retracts in a predetermined cutting depth when the trigger signal is output.

* * * * *